United States Patent
Kim et al.

(10) Patent No.: US 8,331,012 B2
(45) Date of Patent: Dec. 11, 2012

(54) ELECTROPHORETIC DISPLAY DEVICE AND METHOD FOR FABRICATING SPACER FOR ELECTROPHORETIC DISPLAY DEVICE

(75) Inventors: Sang Jin Kim, Gyunggi-do (KR); Yongsoo Oh, Gyunggi-do (KR); Hwan-Soo Lee, Seoul (KR); Jeong Bok Kwak, Gyunggi-do (KR); Sang Moon Lee, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 859 days.

(21) Appl. No.: 12/479,262

(22) Filed: Jun. 5, 2009

(65) Prior Publication Data
US 2010/0117951 A1 May 13, 2010

(30) Foreign Application Priority Data
Nov. 13, 2008 (KR) .................. 10-2008-0112956

(51) Int. Cl.
*G02B 26/00* (2006.01)
*H01L 21/461* (2006.01)
(52) U.S. Cl. ............... 359/296; 438/691; 438/704
(58) Field of Classification Search ........... 257/E21.219, 257/E21.237; 345/107; 359/296; 438/691, 438/745
See application file for complete search history.

(56) References Cited

U.S. PATENT DOCUMENTS

| | | | |
|---|---|---|---|
| 2002/0131148 A1* | 9/2002 | Engler et al. .............. | 359/296 |
| 2005/0152021 A1* | 7/2005 | Stevens .................... | 359/296 |
| 2011/0149379 A1* | 6/2011 | Lee et al. .................. | 359/296 |

FOREIGN PATENT DOCUMENTS

| | | |
|---|---|---|
| JP | 2007-298894 | 11/2007 |
| JP | 2008-533521 A | 8/2008 |
| KR | 10-2004-0108095 A | 12/2004 |
| KR | 10-2007-0071788 A | 7/2007 |
| KR | 10-2008-0036719 A | 4/2008 |
| KR | 10-2008-0052022 A | 6/2008 |
| KR | 10-0843985 | 7/2008 |
| WO | WO 2006/096034 A1 | 9/2006 |
| WO | WO 2009/005232 A1 | 1/2009 |

OTHER PUBLICATIONS

Korean Office Action, with English Translation, issued in Korean Patent Application No. 10-2008-0112956, dated Apr. 16, 2010.
Japanese Office Action, with English translation, issued in Japanese Patent Application No. 2009-143738, dated Dec. 26, 2011.
Korean Office Action issued in Korean Patent Application No. 10-2008-0112956, dated Oct. 28, 2009.

* cited by examiner

*Primary Examiner* — David N Spector
(74) *Attorney, Agent, or Firm* — McDermott Will & Emery LLP

(57) ABSTRACT

An electrophoretic display device includes: a transparent substrate positioned at a display side and having a transparent front electrode; a wiring substrate disposed to face the transparent substrate and having a field applying unit; a spacer disposed between the transparent substrate and the wiring substrate and having a plurality of accommodating holes with upper and lower portions open; and a plurality of microcapsules respectively positioned in the plurality of accommodating holes and including a dispersion solvent encapsulated with a plurality of charged particles contained therein, wherein the accommodating holes comprise upper holes with a width for receiving the microcapsules and lower holes allowing the microcapsules to be mounted thereon.

21 Claims, 5 Drawing Sheets

ELECTROPHORETIC DISPLAY DEVICE AND METHOD FOR FABRICATING SPACER FOR ELECTROPHORETIC DISPLAY DEVICE

CROSS-REFERENCE TO RELATED APPLICATIONS

This application claims the priority of Korean Patent Application No. 2008-0112956 filed on Nov. 13, 2008, in the Korean Intellectual Property Office, the disclosure of which is incorporated herein by reference.

BACKGROUND OF THE INVENTION

1. Field of the Invention

The present invention relates to an electrophoretic display device and, more particularly, to an electrophoretic display device using a micro-capsule and a spacer for accommodating the micro-capsule.

2. Description of the Related Art

An electrophoretic display (EPD) device is a display device that induces electrophoresis of charged particles dispersed in an insulating dispersion solvent on a display surface according to an operation of an electric field and performs displaying by using the optical properties of the charged particles and the dispersion solvent.

The EPD device receives much attention as it consumes less power compared with a liquid crystal display (LCD), has memory characteristics allowing maintaining of a display state without power supply, and in particular, is able to accomplish 'electronic paper'.

In general, the EPD device may be divided into an EPD device having a film type structure in which microcapsules with E-ink, a charged particles-dispersed solvent, encapsulated therein are thinly arranged, and an EPD device having a structure in which microcup type containers are collectively fabricated and E-ink is injected thereinto.

In the EPD device, a technique for disposing the charged particles formed as microcapsules at particular pixel spaces is important. Namely, for a desired display operation, charged particles need to be uniformly disposed at respective pixel areas. In addition, a charged particle disposing method that may perform uniform dispensing (distribution) in a repeated process is required.

SUMMARY OF THE INVENTION

An aspect of the present invention provides an electrophoretic display (EPD) device capable of uniformly disposing microcapsules with a charged particle-dispersed solvent encapsulated therein such that the microcapsules can act as pixels and capable of being fabricated through a simple process.

According to an aspect of the present invention, there is provided an EPD device including: a transparent substrate positioned at a display side and having a transparent front electrode; a wiring substrate disposed to face the transparent substrate and having a field applying unit; a spacer disposed between the transparent substrate and the wiring substrate and having a plurality of accommodating holes with upper and lower portions open; and a plurality of microcapsules respectively positioned in the plurality of accommodating holes and including a dispersion solvent encapsulated with a plurality of charged particles contained therein, wherein the accommodating holes comprise upper holes with a width for receiving the microcapsules and lower holes allowing the microcapsules to be mounted thereon.

The plurality of upper holes may be formed to have a width larger by 5% to 30% than the diameter of the microcapsules.

The field applying unit may be a plurality of field applying units that can be independently driven, and the plurality of accommodating holes may be formed at positions corresponding to the plurality of field applying units.

The lower holes may have an area smaller than the diameter of the microcapsules and have a width decreasing toward its lower portion.

The lower holes may communicate with the upper holes via an opening with a width smaller than the diameter of the microcapsules and have a width increasing toward its lower portion. The lower portion of the lower holes may be provided as a space for accommodating the field applying units.

According to another aspect of the present invention, there is provided a method for fabricating a spacer for an EPD device, including: preparing a substrate; selectively removing an upper surface of the substrate to form a plurality of recesses with a width allowing accommodating of microcapsules; and forming a through hole having a width smaller than that of the recess and decreasing toward its lower portion by applying anisotropic etching to a bottom surface of each recess of the substrate.

The plurality of recesses may be formed to have the same width in a depthwise direction. The plurality of recesses may be formed through a dry etching process.

If necessary, the forming of the plurality of recesses may include forming photoresist such that recess formation regions are exposed, before performing the dry etching.

In this case, the photoresist may be removed after the forming of the through hole.

The substrate may be a semiconductor single crystalline substrate. In this case, the anisotropic etching process may be performed as a wet etching process, and a slope inner side wall of the through holes obtained through the wet etching process is a stable crystal face with a lower etching rate based on the wet etching process than that of a bottom surface of the recesses.

If necessary, the method may further include polishing a lower surface of the substrate to reduce the thickness of the substrate, after the through hole formation process.

According to still another aspect of the present invention, there is provided a method for fabricating a spacer for an EPD device, including: preparing a substrate; selectively removing an upper surface of the substrate to form a plurality of recesses with a width allowing accommodating of microcapsules; and anisotropic-etching recess formation positions of a lower surface of the substrate to form through holes communicating with the recesses via an opening with a width smaller than that of the recesses and having a width increasing toward its lower portion.

According to embodiments of the present invention, the EPD display device can be implemented such that the microcapsules with the charged particle-dispersed solvent encapsulated therein are uniformly disposed by using a spacer unit with accommodating holes and act as pixels.

In particular, because the accommodating holes have the penetrating structure, when a microcapsule storage solution is dropped, the microcapsules can be easily disposed at proper positions of the accommodating holes and only the storage solution can be discharged through the penetrating structure.

In addition, because the opening portion penetratingly formed at the lower portion is utilized as a disposition space of the field applying unit, a precise electrical connection with the charged particles can be achieved, and thus, a response speed and efficiency can be improved.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
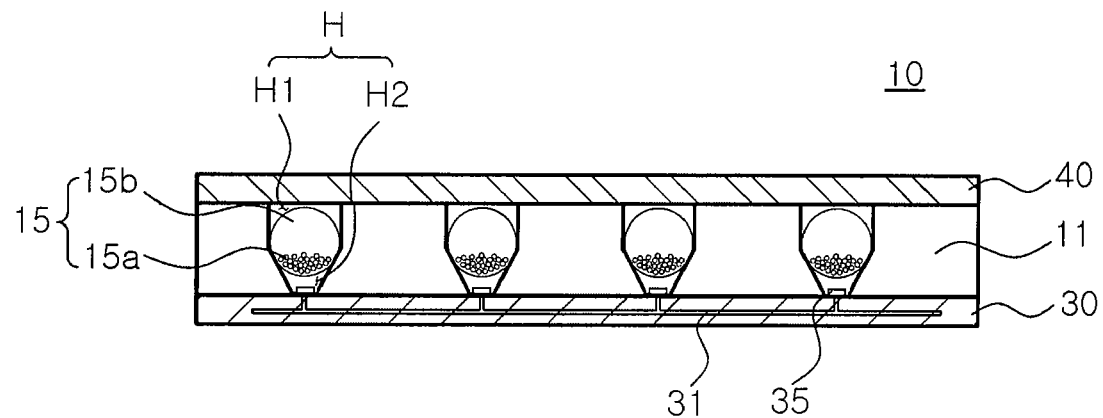
FIG. 1 is a sectional view illustrating an electrophoretic display (EPD) device according to a first embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a sectional view illustrating an electrophoretic display (EPD) device according to a first embodiment of the present invention.

As shown in FIG. 1, an EPD device 10 according to a first embodiment of the present invention includes a transparent substrate 40 having a transparent electrode (not shown), a wiring substrate 30 disposed to face the transparent substrate 40 and including field applying units 35 and a wiring part 31, and a spacer 11 interposed between the transparent substrate 40 and the wiring substrate 30 and accommodating microcapsules 15.

Each microcapsule 15 includes a dispersion solvent 15b encapsulated with a plurality of charged particles 15a contained therein. The spacer 11 includes a plurality of accommodating holes (H) with upper and lower portions formed in a penetrating manner, at which the microcapsules 15 are mounted.

Figure 2:
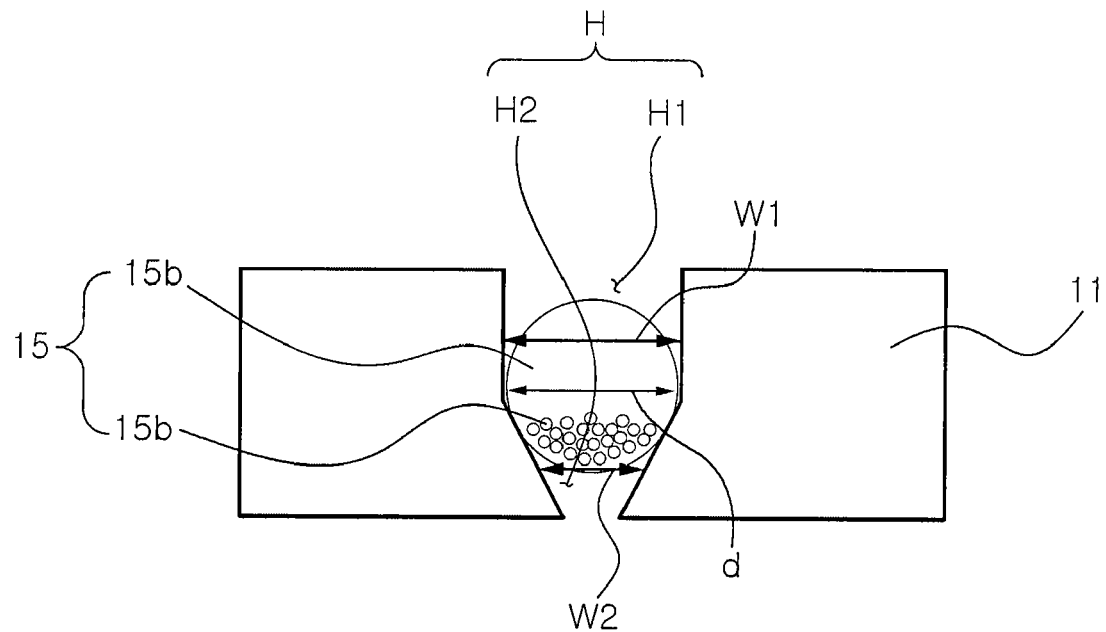
FIG. 2 is an enlarged sectional view illustrating a spacer employed for the EPD device of FIG. 1.

As shown in FIG. 2, the accommodating hole (H) has such a proper structure as to accommodate the microcapsule 15. In the first embodiment of the present invention, the accommodating hole (H) includes an upper hole H1 and a lower hole H2 according to their width and shape.

The upper hole H1 region has a width W1 sufficient to accommodate the microcapsule 15, and may have the same width in a depthwise direction as illustrated. Preferably, the width W1 of the upper hole H1 is larger by 5% to 30% than the diameter (d) of the microcapsule 15 so that the microcapsule 15 can be easily received therein and its position may not be excessively changed within the accommodating hole (H).

A width (W2) of the lower hole H2 region is smaller than the diameter (d) of the microcapsule, so that the microcapsule 15 can be stably mounted within the accommodating hole (H). In this embodiment, the lower hole H2 has a width decreasing toward its lower portion.

The spacer 11 is not limited, but preferably, it may be formed in a semiconductor single crystalline substrate. In this case, an inner slope face of the lower hole H2 may be a relatively stable crystal face that can be obtained through wet etching.

In the first embodiment of the present invention, the wiring substrate 30 includes a plurality of field applying units 35 that can be independently driven. The field applying unit may be a thin film transistor (TFT). The field applying units 35 are disposed to correspond to the positions of the plurality of accommodating holes H and independently drive the microcapsules each positioned at the respective accommodating holes H as a single pixel unit.

In this manner, the microcapsules 15 can be uniformly disposed by using the spacer 11 where the plurality of accommodating holes H are formed, and operated as pixels.

In particular, as shown in FIG. 1, the portions of the field applying units may be positioned at the lower region of the penetratingly formed accommodating holes. Accordingly, the positions of the microcapsules 15 can be precisely set by the accommodating holes (H) and positioned to be adjacent to the field applying units 35, thereby improving a response speed and efficiency.

However, as for the structure of the lower hole H2 employed in the first embodiment of the present invention, because the lower hole H2 decreases toward its lower portion, it is difficult to secure a sufficient space for accommodating the field applying unit 35 such as a TFT. In an effort to solve this problem, an embodiment as illustrated in FIGS. 3 and 4 may be taken into consideration.

Figure 3:
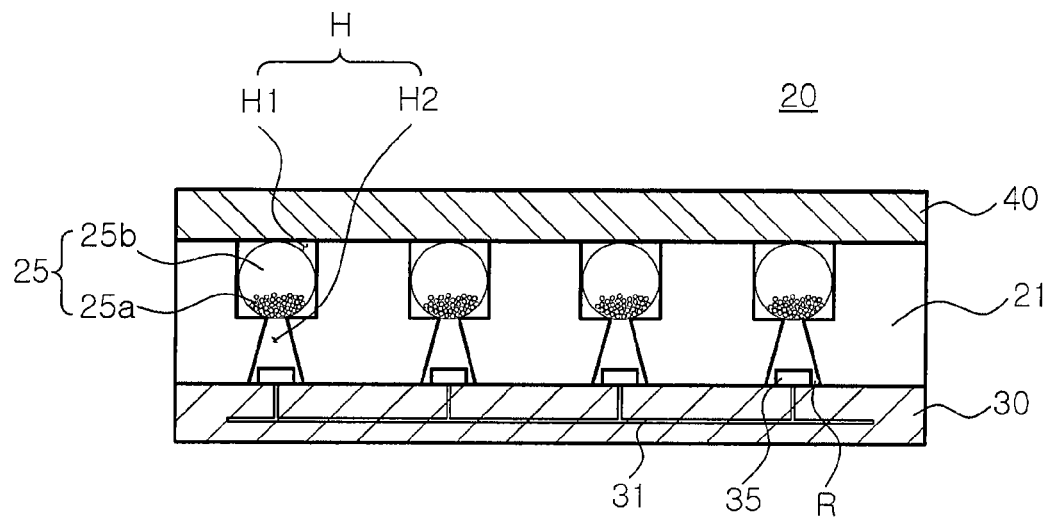
FIG. 3 is a sectional view illustrating an electrophoretic display (EPD) device according to a second embodiment of the present invention.
Figure 4:
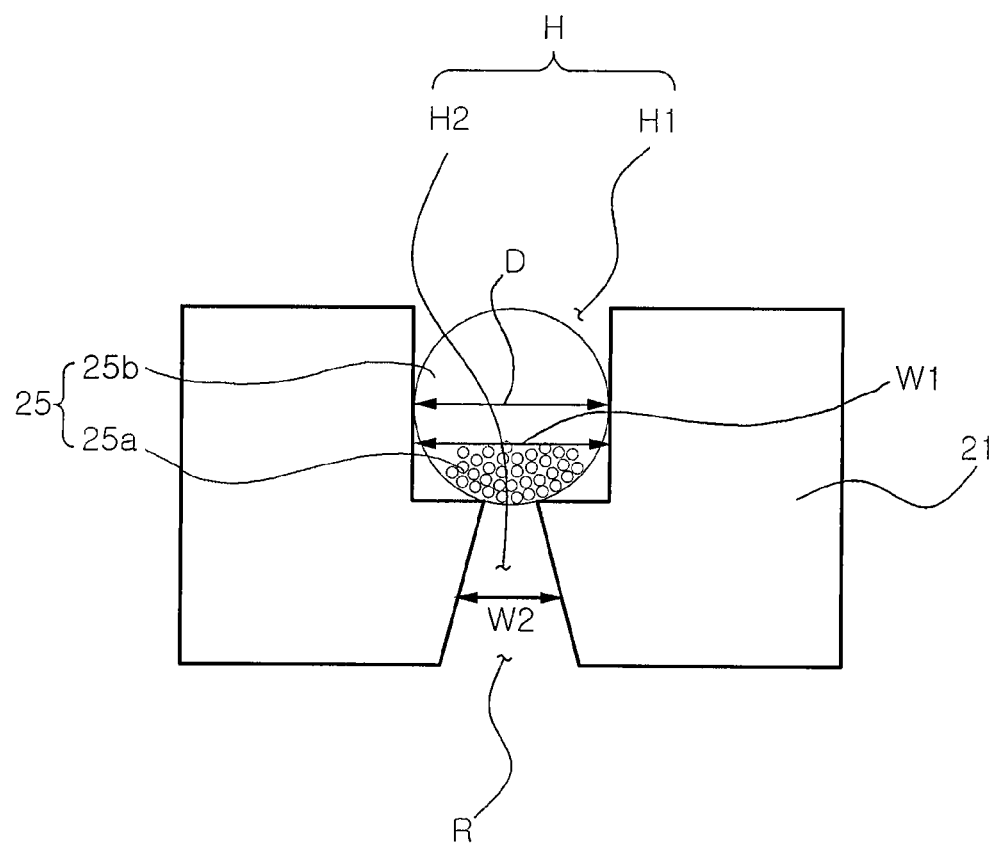
FIG. 4 is an enlarged sectional view illustrating a spacer employed for the EPD device of FIG. 3.

FIG. 3 is a sectional view illustrating an electrophoretic display (EPD) device according to a second embodiment of the present invention.

As shown in FIG. 3, an EPD device 20 according to the second embodiment of the present invention includes the transparent substrate 40 having a transparent electrode (not shown), the wiring substrate 30 disposed to face the transparent substrate 40 and including field applying units 35 and a wiring part 31, and a spacer 21 interposed between the transparent substrate 40 and the wiring substrate 30 and accommodating microcapsules 25.

Similar to the first embodiment of the present invention, each microcapsule 25 includes a dispersion solvent 25b encapsulated with a plurality of charged particles 15a contained therein. The spacer 21 includes a plurality of accommodating holes (H) with upper and lower portions formed in a penetrating manner, at which the microcapsules 25 are mounted.

In the second embodiment of the present invention, as shown in FIG. 4, the receiving hole (H) includes an upper hole H1 with a certain width (W1) and a lower hole H2 shaped to allow the microcapsule 25 to be mounted thereon.

The upper hole (H1) region has the width (W1) allowing the microcapsule 25 to be received. As illustrated, the width W1 of the upper hole H1 may have the same width in a depthwise direction as illustrated, and is larger by 5% to 30% than the diameter (d) of the microcapsule 25 so that the microcapsule 15 can be easily received therein and its position may not be excessively changed within the accommodating hole (H).

Unlike the first embodiment of the present invention, the lower hole H2 region communicates with the upper hole H1 by an opening with a smaller width than the diameter (d) of the microcapsule and decreases toward its lower portion. When the spacer 21 is formed in a semiconductor single crystalline substrate, an inner slope face of the lower hole H2 may be a relatively stable crystal face that can be obtained through wet etching.

In the second embodiment of the present invention, the field applying units 35 are disposed to correspond to the positions of the plurality of accommodating holes H and independently drive the microcapsules each positioned at the respective accommodating holes H as a single pixel unit. A broad space (R) at the lower portion of the penetratingly formed accommodating hole H may provide a sufficient space for accommodating the respective field applying units. Thus, the microcapsules 25 and the field applying units 35 can be precisely matched at their positions, and as a result, a response speed and efficiency can be improved.

FIGS. 5a to 5e are sectional views illustrating a sequential process of forming the spacer employed for the first embodiment of the present invention.

Figure 5A:
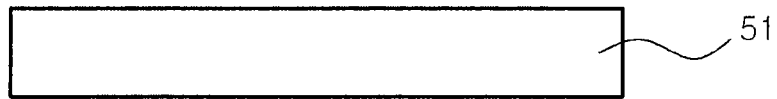
FIGS. 5a to 5e are sectional views illustrating a sequential process of forming the spacer employed for the first embodiment of the present invention.

First, as shown in FIG. 5a, a substrate 51 for fabricating a spacer is prepared.

Preferably, the substrate 51 may be a semiconductor single crystalline substrate such as silicon (Si) substrate. The single crystalline substrate may easily accomplish a desired accommodating hole structure by using the difference between etching rates of crystal faces, details of which will be described in follow-up processes. Next, an upper surface of the substrate 51 is selectively removed to form a plurality of recesses with a width for accommodating the microcapsules.

Figure 5B:
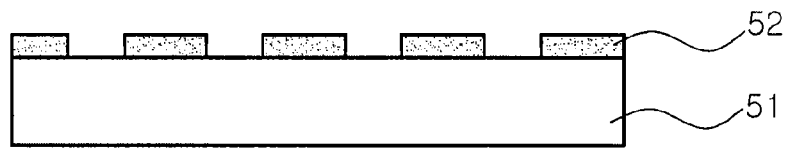
Figure 5C:
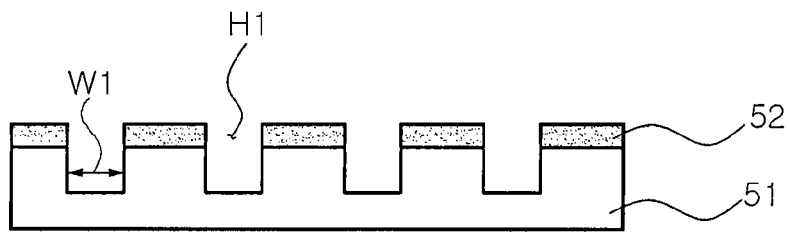

This process may be performed by using a known precise processing means such as laser beam, and preferably, a selective dry etching process as shown in FIGS. 5b and 5c is used.

As shown in FIG. 5b, photoresist 52 is formed on the upper surface of the substrate 51 such that desired accommodating hole formation regions are exposed. And then, as shown in FIG. 5c, a dry etching process is performed to form the recesses H1 by using the photoresist 52 as a mask. In this case, an inductively coupled plasma-reactive ion etching (ICP-RIE) may be performed as the dry etching process.

Because the dry etching, i.e., anisotropy etching, is applied, the recesses H1 may be formed to have the same width along the depthwise direction. In addition, a desired depth of the recesses H1 may be obtained by adjusting the etching depth. The recesses H1 formed in this process may be understood as the region corresponding to the upper hole as described above with reference to FIG. 2.

Figure 5D:
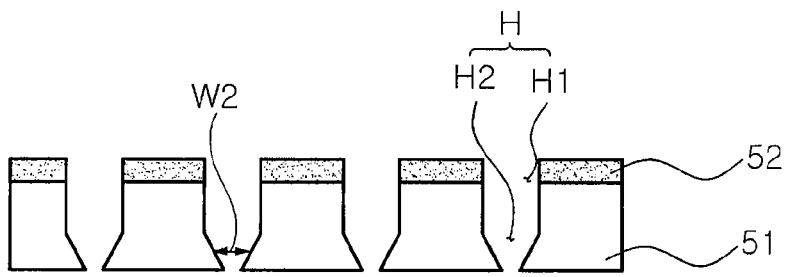

Thereafter, as shown in FIG. 5d, anisotropic etching is applied to the bottom of each recess H1 of the substrate 51 to form the through holes H2 with a width W2 which is smaller than the width (W1) of the recess and decreases toward its lower portion.

The through holes H2 formed in this process may be understood as the region corresponding to the lower holes described above with reference to FIG. 2. The through holes H2 have an area with a width smaller than at least the diameter of the microcapsule to allow the microcapsule to be mounted thereon. If the substrate 51 is a semiconductor single crystalline substrate, an inner slope face of the through hole H2 may be a stable crystal face with a lower etching rate based on wet etching than that of the crystal face corresponding to the bottom surface of the recess H1.

The process for forming the through holes H2 may be performed while maintaining the photoresist 52 formed in the process as shown in FIG. 5b. The through hole H2 may be provided as the accommodating hole (H) penetrating the substrate 51 together with the previously formed recess H1.

Figure 5E:
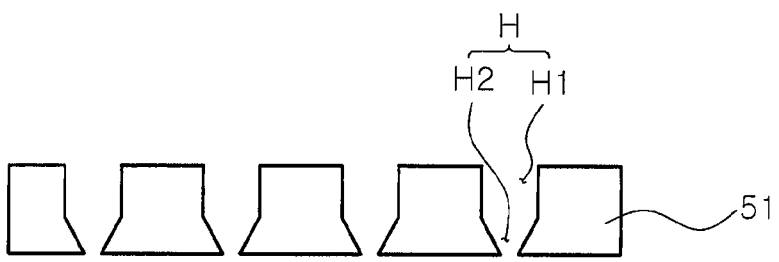

And then, as shown in FIG. 5e, the photoresist 52 is removed to form the spacer 51 having a plurality of accommodating holes (H). Here, a process of polishing a lower surface of the spacer 51 may be additionally performed to reduce the thickness of the spacer 51. Through the polishing process, the distance between the microcapsules to be disposed in the accommodating holes and the field applying units positioned at the lower portion of the accommodating holes can be adjusted.

Figure 6:
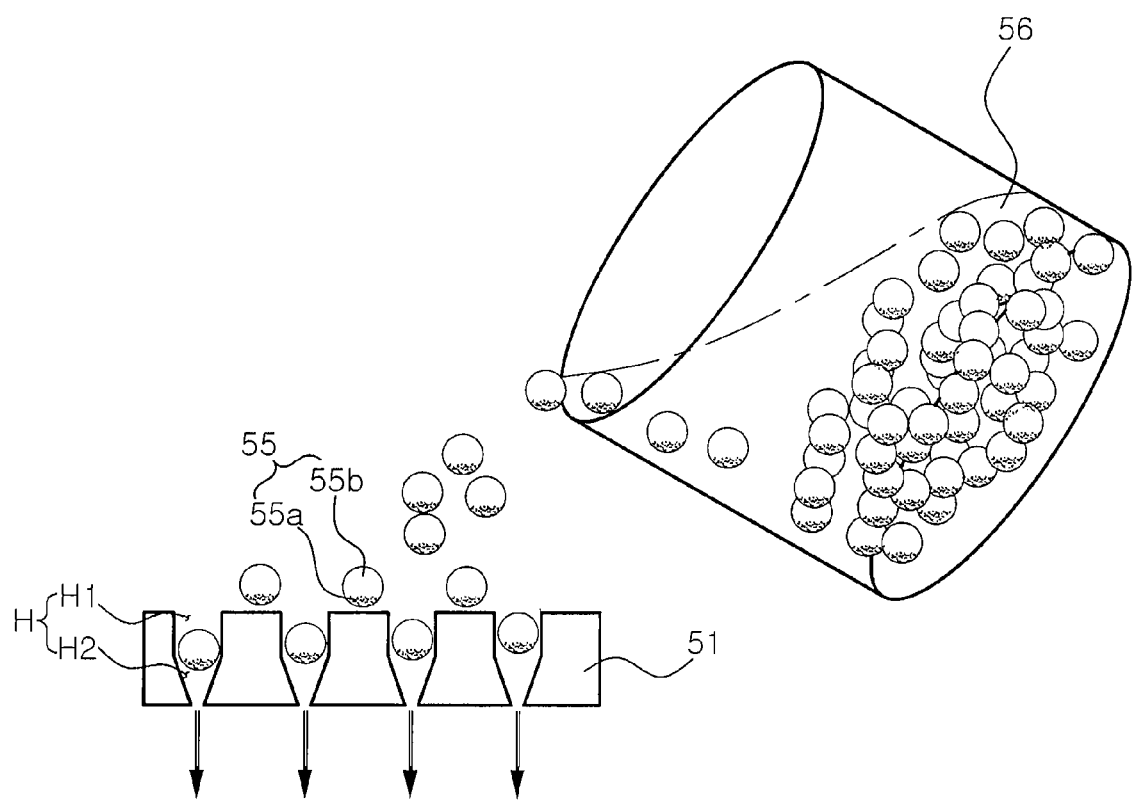
FIG. 6 is a schematic view illustrating a process of disposing microcapsules in the spacer formed in FIG. 5e.

FIG. 6 is a schematic view illustrating the process of disposing microcapsules in the spacer formed in FIG. 5e.

Disposing of microcapsules 55 by using the spacer 51 employed in the present embodiment is executed by simply pouring a storage solution 56 of the microcapsules 55 present in a container onto the spacer 51. The microcapsules 55 including a solvent 55b with dispersed charged particles 55a encapsulated therein are accommodated in the space provided by the accommodating holes (H). At this time, the storage solution 56 is discharged through the accommodating holes (H) having the penetrating structure. Through this process, the microcapsules 55 can be disposed in the accommodating holes (H) of the spacer 51.

FIGS. 7a to 7f are sectional views illustrating a sequential process of forming the spacer employed for the second embodiment of the present invention.

Figure 7A:
FIGS. 7a to 7f are sectional views illustrating a sequential process of forming the spacer employed for the second embodiment of the present invention.

First as shown in FIG. 7a, a substrate 71 for fabricating a spacer is prepared. Preferably, the substrate 71 may be a semiconductor single crystalline substrate such as a silicon (Si) substrate.

Next, an upper surface of the substrate 71 is selectively removed to form a plurality of recesses H1 with a width for accommodating the microcapsules. This process may be performed by using a known precise processing means such as laser beam.

Figure 7B:
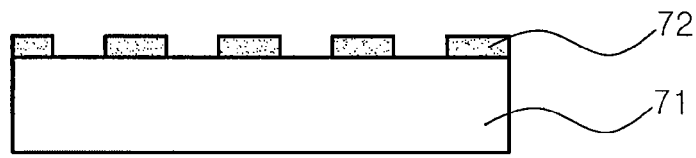
Figure 7C:
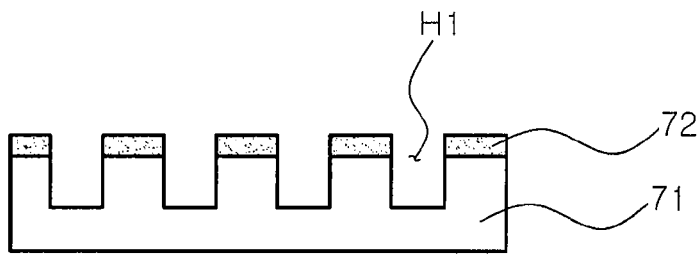

A first photoresist 72 is formed on the upper surface of the substrate 71 such that desired accommodating hole formation regions are exposed, and as shown in FIG. 7b, a dry etching process is performed to form the recesses H1 by using the photoresist 72 as a mask.

Because the dry etching, i.e., anisotropy etching, is applied, the recesses H1 may be formed to have the same width along the depthwise direction.

And then, the through holes H2 are formed at the hole formation positions of a lower surface of the substrate 71.

Figure 7D:
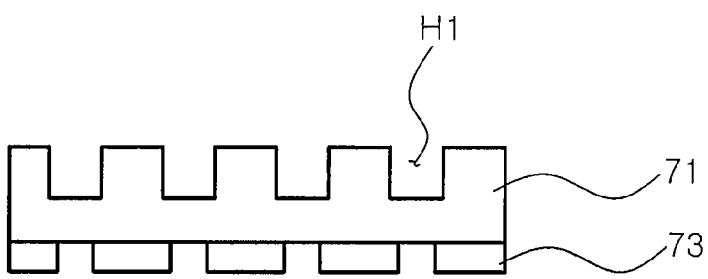

In more detail, as shown in FIG. 7d, a second photoresist 73 is formed on the lower surface of the substrate 71 such that the regions corresponding to the hole formation regions are exposed.

Figure 7E:
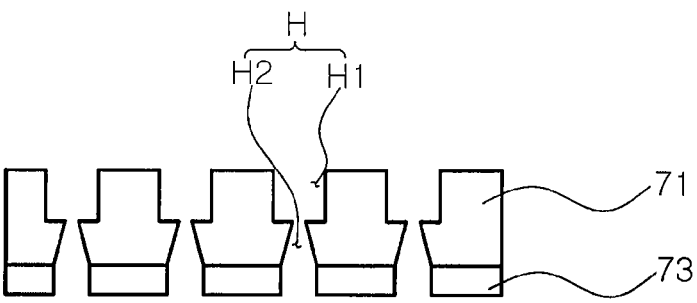

Thereafter, as shown in FIG. 7e, anisotropy etching is applied to the lower surface of the substrate 71 to form the through holes H2 which communicates with the recesses H1 by an opening with a width smaller than that of the recesses H1 and increases toward their lower portion. If the substrate 71 is a semiconductor single crystalline substrate, an inner slope face of the through hole H2 may be a stable crystal face with a lower etching rate based on wet etching than that of the crystal face corresponding to the bottom surface of the recess H1.

The process for forming the through holes H2 may be performed while maintaining the photoresist 52 formed in the process as shown in FIG. 5b. The through hole H2 may be provided as the accommodating hole (H) penetrating the substrate 71 together with the previously formed recess H1.

Figure 7F:
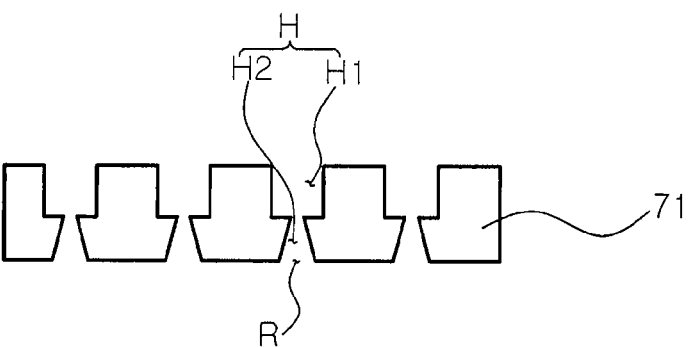

And then, as shown in FIG. 7f, the photoresist 72 is removed to form the spacer 71 having a plurality of accommodating holes (H). The lower portion of the accommodating hole (H) formed according to this embodiment has a relatively large width, so it can provide a space for receiving the field applying unit such as a TFT.

Also, if necessary, a process of polishing the lower surface of the spacer 71 may be additionally performed to reduce the thickness of the spacer 71. Through the polishing process, the distance between the microcapsules to be disposed in the accommodating holes and the field applying units positioned at the lower portion of the accommodating holes can be adjusted.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrophoretic display device comprising:
   a transparent substrate positioned at a display side and having a transparent front electrode;
   a wiring substrate disposed to face the transparent substrate and having a field applying unit;
   a spacer disposed between the transparent substrate and the wiring substrate and having a plurality of accommodating holes with upper and lower portions open; and
   a plurality of microcapsules respectively positioned in the plurality of accommodating holes and including a dispersion solvent encapsulated with a plurality of charged particles contained therein,
   wherein the accommodating holes comprise upper holes with a width for receiving the microcapsules and lower holes allowing the microcapsules to be mounted thereon.

2. The device of claim 1, wherein the upper holes are formed to have a width larger by 5% to 30% than the diameter of the microcapsules.

3. The device of claim 1, wherein the field applying unit is a plurality of field applying units that can be independently driven, and the plurality of accommodating holes are formed at positions corresponding to the plurality of field applying units.

4. The device of claim 3, wherein the lower holes have an area smaller than the diameter of the microcapsules and have a width decreasing toward its lower portion.

5. The device of claim 3, wherein the lower holes communicate with the upper holes via an opening with a width smaller than the diameter of the microcapsules and have a width increasing toward its lower portion.

6. The device of claim 5, wherein the lower portion of the lower holes is provided as a space for accommodating the field applying units.

7. The method of claim 6, further comprising:
   polishing a lower surface of the substrate to reduce the thickness of the substrate, after the through hole formation process.

8. A method for fabricating a spacer for an electrophoretic display device, the method comprising:
   preparing a substrate;
   selectively removing an upper surface of the substrate to form a plurality of recesses with a width allowing accommodating of microcapsules; and
   forming through holes having a width smaller than that of the recess and decreasing toward its lower portion by applying anisotropic etching to a bottom surface of each recess of the substrate.

9. The method of claim 8, wherein the plurality of recesses are formed to have the same width in a depthwise direction.

10. The method of claim 9, wherein the substrate is a semiconductor single crystalline substrate.

11. The method of claim 10, wherein the anisotropic etching process is performed as a wet etching process, and a slope inner side wall of the through holes obtained through the wet etching process is a stable crystal face with a lower etching rate based on the wet etching process than that of a bottom surface of the recesses.

12. The method of claim 9, wherein the plurality of recesses are formed through a dry etching process.

13. The method of claim 12, wherein the forming of the plurality of recesses comprises:
   forming a photoresist such that recess formation regions are exposed, before the dry etching is performed.

14. The method of claim 13, wherein the photoresist is removed after the forming of the through holes.

15. A method for fabricating a spacer for an electrophoretic display device, the method comprising:
   preparing a substrate;
   selectively removing an upper surface of the substrate to form a plurality of recesses with a width allowing accommodating of microcapsules; and
   anisotropic-etching recess formation positions of a lower surface of the substrate to form through holes communicating with the recesses via an opening with a width smaller than that of the recesses and having a width increasing toward its lower portion.

16. The method of claim 15, further comprising:
   polishing the lower surface of the substrate to reduce the thickness of the substrate, after the through hole formation process.

17. The method of claim 15, wherein the anisotropic etching process is performed as a wet etching process, and a slope inner side wall of the through holes obtained through the wet etching process is a stable crystal face with a lower etching rate based on the wet etching process than that of the lower surface of the substrate.

18. The method of claim 15, wherein the plurality of recesses have the same width in a depthwise direction.

19. The method of claim 18, wherein the plurality of recesses are formed through a dry etching process.

20. The method of claim 19, wherein the forming of the plurality of recesses comprise:
   forming photoresist such that recess formation regions are exposed, before performing the dry etching process.

21. The method of claim 20, wherein the forming of the through holes comprises:
   forming photoresist such that recess formation positions are exposed, before performing anisotropic etching.

* * * * *